US010786793B2

(12) United States Patent
Bahabri

(10) Patent No.: US 10,786,793 B2
(45) Date of Patent: Sep. 29, 2020

(54) BLENDING LIQUIDS

(71) Applicant: Nota Nota FZE, Umm Al Quwain (AE)

(72) Inventor: Abdullah Bahabri, Riaydh (SA)

(73) Assignee: Nota Nota FZE, Umm Al Quwain (AE)

( * ) Notice: Subject to any disclaimer, the term of this patent is extended or adjusted under 35 U.S.C. 154(b) by 0 days.

(21) Appl. No.: 16/061,002

(22) PCT Filed: Dec. 15, 2015

(86) PCT No.: PCT/IB2015/002341
§ 371 (c)(1),
(2) Date: Jun. 11, 2018

(87) PCT Pub. No.: WO2017/103634
PCT Pub. Date: Jun. 22, 2017

(65) Prior Publication Data
US 2018/0361334 A1    Dec. 20, 2018

(51) Int. Cl.
*B01F 13/10*    (2006.01)
*B01F 15/04*    (2006.01)
*G01F 11/02*    (2006.01)

(52) U.S. Cl.
CPC ...... *B01F 13/1058* (2013.01); *B01F 13/1066* (2013.01); *B01F 13/1069* (2013.01);
(Continued)

(58) Field of Classification Search
CPC .............. B01F 13/1058; B01F 13/1061; B01F 13/1063; B01F 13/1066; B01F 13/1069;
(Continued)

(56) References Cited

U.S. PATENT DOCUMENTS 7,296,945 B1 * 11/2007 Byun ................... A45D 34/042
401/286
2012/0175383 A1    7/2012 Engels et al.
2012/0248147 A1    10/2012 Krom et al.

FOREIGN PATENT DOCUMENTS

EP          0461371 A1    12/1991
WO         2014066721    1/2014

OTHER PUBLICATIONS

Original of EP 1093842 A1; Esmoris Rodriguez, Maria Jesus; Apr. 25, 2001.*

(Continued)

*Primary Examiner* — Paul J Gray
(74) *Attorney, Agent, or Firm* — Underwood & Associates, LLC

(57) ABSTRACT

An apparatus for blending liquids, comprising a main body (100) comprising a seating (106) configured to receive a receptacle (200); a support (140) carried by the main body and having a plurality of slots (142, 142'), the support being configured to receive a plurality of cartridges (300, 300'), each slot (142, 142') of the plurality of slots being configured to receive a cartridge (300, 300') of the plurality of cartridges; a first actuator configured to move one of the support and the seating relative to the other, thereby enabling positioning of any one slot of the plurality of slots in correspondence of the seating; a second actuator (120) configured to act upon a cartridge (300') placed in the slot (142') currently positioned in correspondence of the seating; and a control unit (150) connected to the first and second actuators. The control unit is configured to receive a data set indicative of a sequence of one or more liquids and, for each of the one or more liquids, an associated quantity of liquid; and for each respective liquid of the sequence of one or more liquids to control the first actuator to move the support or the seating relatively to the other such that the slot holding a respective (Continued)

cartridge of the plurality of cartridges is positioned in correspondence of the seating, the respective cartridge containing the respective liquid of the sequence of one or more liquids; and to control the second actuator to act upon the respective cartridge to cause transfer of a respective quantity of liquid from the respective cartridge into a receptacle positioned in the seating, the respective quantity corresponding to the associated quantity of liquid. A process for blending liquids is also provided.

17 Claims, 8 Drawing Sheets

(52) U.S. Cl.
CPC ........ *B01F 15/0462* (2013.01); *G01F 11/024* (2013.01); *G01F 11/029* (2013.01); *B01F 2215/0031* (2013.01)

(58) Field of Classification Search
CPC ... B01F 15/0462; G01F 11/024; G01F 11/029
USPC .................................................. 141/27, 103
See application file for complete search history.

(56) References Cited

OTHER PUBLICATIONS

International Searching Authority; International Search Report for PCT/IB2015/002341; dated Sep. 26, 2016; European Patent Office, NL-2280 HV Rijawijk.
International Searching Authority; Written Opinion of the International Searching Authority for PCT/IB2015/002341; dated Sep. 26, 2016; European Patent Office, NL-2280 HV Rijawijk.

* cited by examiner

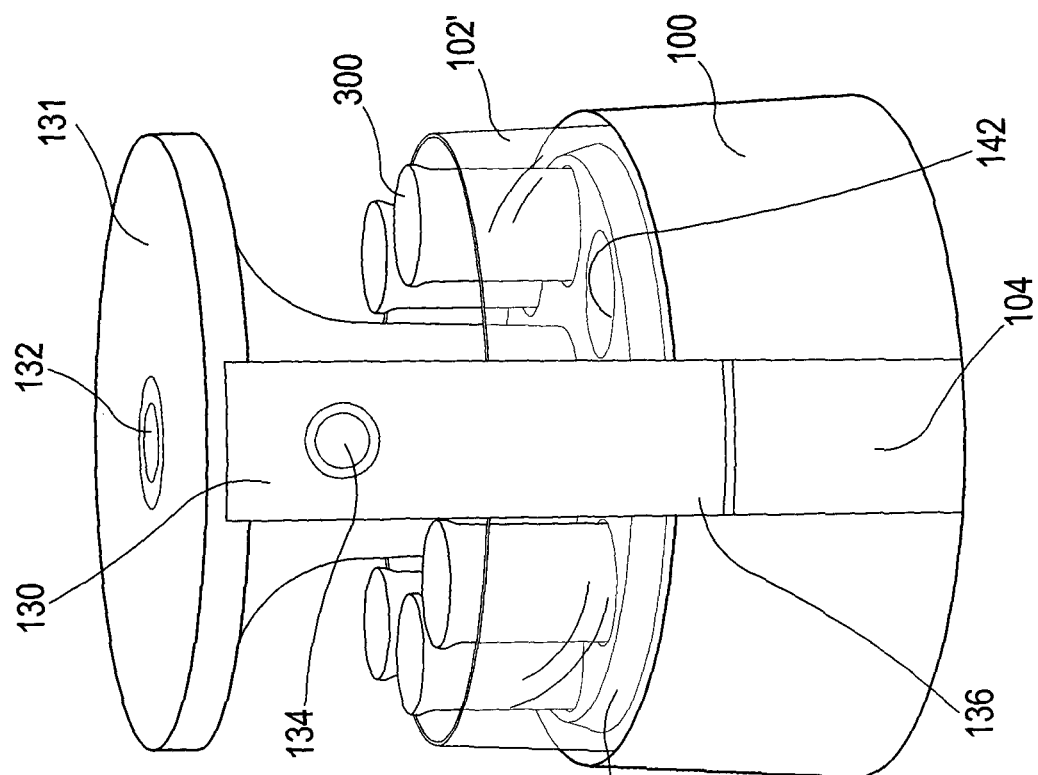
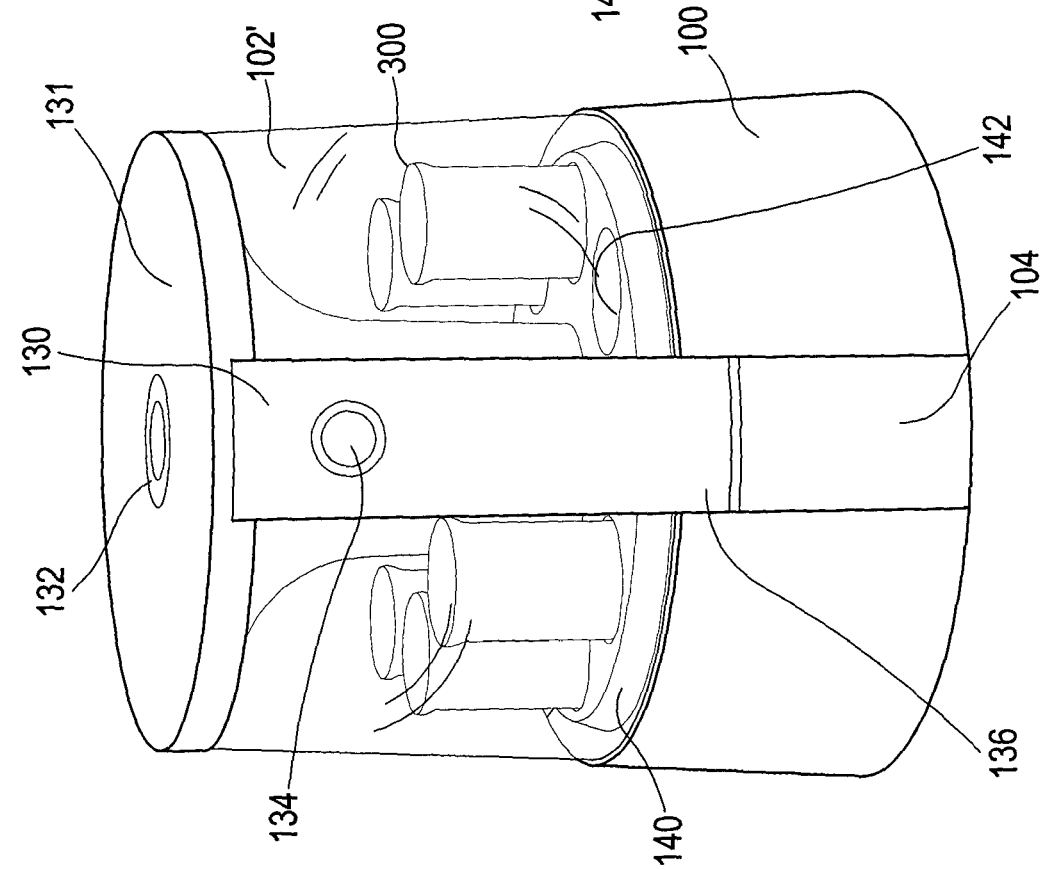
FIG.3E
FIG.3D

BLENDING LIQUIDS

TECHNICAL FIELD

The present invention relates to a method and apparatus for blending liquids, in particular perfume. In accordance with certain aspects, the invention relates to a method and apparatus for dispensing, from a plurality of liquid-holding cartridges, predetermined amounts of liquid into a receptacle. In accordance with other aspects, the invention relates a method and apparatus for dispensing predetermined amounts of liquid in accordance with a recipe stored in a storage device.

BACKGROUND ART

Devices for preparing mixtures of a plurality of liquids can be found in different areas of technology, for example in beverage production, in preparation of chemical or industrial composite liquids, or in the medical field. The overall requirements, for example regarding the amounts of liquids processed over time or the accuracy in which the constituent component liquids are dispensed and mixed, vary greatly depending upon the respective field.

One area with particular requirements is the preparation of perfume compositions, in which relatively small quantities of liquids have to be blended, often in a particular sequence, in order to achieve a desired composition of fragrances. In particular in a home setting the manual blending of liquids is a challenging process.

Generally, essential oils and/or fragrances (e.g. synthetic compositions corresponding to different notes) are blended in particular ratios and in a particular sequence, in order to achieve a desired result. In some examples, a base note, a middle note, and a top note, are mixed in sequence, with the base note typically representing about 20% of the composition, the middle note typically representing about 50% of the composition, and the top note typically representing about 30% of the composition. These ratios vary depending on the individual liquids used, on the preparation process employed, and on the result to be achieved.

Notes refer to an individual scent typically selected from one or more families of scents comprising, for example, floral, oriental, spicy, citrus, and many more. Further, one or more oils and diluting agents, for example rubbing alcohol or high-proof alcohol, as well as a very small amount of an additional bridge note and/or water are added in some examples. The constituent component liquids are typically added in a particular sequence and optionally mixed and/or processed further (e.g. adding additives or letting the composition sit for a predetermined amount of time). Once the process has been concluded, the composite liquid can be dispensed like off-the-shelf products, for example using a spray flacon or a vaporizer.

U.S. Pat. No. 8,490,873 discloses a vending machine for dispensing a selected blend of perfumes in response to the deposit of a pre-selected sum of money. The machine includes a plurality of containers and a plurality of distinctive scents with one of the scents disposed in each of the containers. A mechanism for selecting one or more of the scents and an amount of one or more of the scents is provided. Further, the vending machine includes a mechanism for blending the selected scents in the selected percentages and providing a sample to a perspective customer. Further, the mechanism includes a slot receiving payment for a quantity of the selected blend together with a delivery process for providing a bottle of the selected perfume to the customer.

CN 203935787 U discloses an apparatus for perfume formulation, particularly a high-precision automatic deployment perfume formulation device. The device comprises a housing provided with a motor-driven carriage and a main deployment disk carrying a number of formulations. The device further comprises a perfume bottle storage chamber and a mixing chamber provided with a motor driven mixing mechanism. A control section of the apparatus controls the release of the formulations via valves (e.g. solenoid valves or other automatic control valves) and the final preparation includes placing the solution in the mixer.

Therefore, it is an object of the invention to provide a method and apparatus for blending liquids, in particular perfume. It is a further object to provide a method and apparatus for blending liquids, which allows a user to prepare a desired blend of liquids according to a predetermined preparation formula, the formula being processed by the apparatus and the respective quantities being selected and provided automatically. It is a further object to provide a method and apparatus for blending liquids, which operates on the basis of a number of cartridges being installed in the apparatus, with each cartridge containing a particular component liquid, for example essential oils, fragrances, alcohols, water, fixatives or other. In some embodiments, a single cartridge can contain an individually prepared composition of one or more of essential oils, fragrances, alcohols, water, fixatives or other liquids.

SUMMARY OF THE INVENTION

One or more of the objects specified above are substantially achieved by a method and by an apparatus according to any one of the appended claims. Aspects of the invention are disclosed below.

According to the invention, in a $1^{st}$ aspect there is provided an apparatus (1) for blending liquids, comprising a main body (100) comprising a seating (106) configured to receive a receptacle (200); a support (140) carried by the main body and having a plurality of slots (142, 142'), the support being configured to receive a plurality of cartridges (300, 300'), each slot (142, 142') of the plurality of slots being configured to receive a cartridge (300, 300') of the plurality of cartridges; a first actuator configured to move one of the support and the seating relative to the other, thereby enabling positioning of any one slot of the plurality of slots in correspondence of the seating; a second actuator (120) configured to act upon a cartridge (300') placed in the slot (142') currently positioned in correspondence of the seating; and a control unit (150) connected to the first and second actuators and configured to: receive a data set indicative of a sequence of one or more liquids and, for each of the one or more liquids, an associated quantity of liquid; and, for each respective liquid of the sequence of one or more liquids: to control the first actuator to move the support or the seating relatively to the other such that the slot holding a respective cartridge of the plurality of cartridges is positioned in correspondence of the seating, the respective cartridge containing the respective liquid of the sequence of one or more liquids; and to control the second actuator to act upon the respective cartridge to cause transfer of a respective quantity of liquid from the respective cartridge into a receptacle positioned in the seating, the respective quantity corresponding to the associated quantity of liquid.

In a 2$^{nd}$ aspect according to the 1$^{st}$ aspect, the apparatus further comprises storage means (152).

In a 3$^{rd}$ aspect according to the 2$^{nd}$ aspect, the storage means (152) are configured to store a plurality of data sets and wherein the control unit (150) is configured to receive the data set from the storage means, the data set corresponding to one of the plurality of data sets.

In a 4$^{th}$ aspect according to any one of aspects 1 or 2, the apparatus further comprises sensing means connected to the control unit (150) and configured to determine properties of a respective cartridge (300, 300') positioned in correspondence of the sensing means; wherein the first actuator is further configured to move one of the support and the sensing means relative to the other, thereby enabling positioning of any one slot (142, 142') of the plurality of slots in correspondence of the sensing means; optionally wherein the storage means (152) are further configured to store status data indicative of the properties of each cartridge of the plurality of cartridges.

In a 5$^{th}$ aspect according to the 4$^{th}$ aspect, the control unit (150) is further configured to: generate status data based on the plurality of cartridges; and store the status data in the storage means (152); optionally wherein the generating comprises, for each respective slot (142, 142') of the plurality of slots of the support (140): controlling the first actuator to position the respective slot of the plurality of slots in correspondence of the sensing means; controlling the sensing means to determine the presence of a respective cartridge of the plurality of cartridges in the respective slot of the plurality of slots; and, if the presence of the respective cartridge has been determined, controlling the sensing means to determine the properties of the respective cartridge, generating a status entry indicative of the properties of the respective cartridge, and appending the status entry to the status data.

In a 6$^{th}$ aspect according to any one of aspects 4 and 5, the control unit (150) is further configured to determine, upon receiving the data set and based on the data set and the status data, whether any of the following conditions is fulfilled: the sequence of one or more liquids the data set is indicative of includes at least one liquid for which no corresponding cartridge (300, 300') of the plurality of cartridges is contained in the status data; the sequence of one or more liquids the data set is indicative of includes at least one associated quantity of liquid to be released for which a corresponding cartridge of the plurality of cartridges contained in the status data is associated with an insufficient amount of liquid contained in the corresponding cartridge.

In a 7$^{th}$ aspect according to any one of aspects 5 and 6, the determining of the presence of the respective cartridge (300, 300') and/or the determining of the properties of the respective cartridge is based on an identification element (307) comprised in the respective cartridge.

In an 8$^{th}$ aspect according to the 7$^{th}$ aspect, the identification element (307) is indicative of the properties, the identification element comprising one of: a machine-readable optical pattern, optionally a bar code, a matrix code, or a QR code; a radio frequency identification tag (RFID tag); an integrated circuit, optionally the integrated circuit being configured for data communication with the control unit.

In a 9$^{th}$ aspect according to any one of aspects 4 to 8, the properties include: a type of liquid of a respective cartridge (300, 300'); a concentration value indicative of a concentration of a substance present in the liquid of a respective cartridge; a number of release cycles the respective cartridge has been subjected to; an expiration date indicative of a storage life of the liquid contained in a respective cartridge; and an amount of liquid contained in a respective cartridge.

In a 10$^{th}$ aspect according to any one of aspects 1 to 9, when one cartridge (300') of the plurality of cartridges is positioned in correspondence of the seating, an outlet of the respective cartridge is positioned with respect to a receptacle (200) placed in the seating (106), so that the second actuator (120) can be controlled to cause transfer of liquid from the respective cartridge through the outlet and into the receptacle placed in the seating.

In an 11$^{th}$ aspect according to any one of aspects 1 to 10, the apparatus further comprises an interface configured to receive input from a user, the control unit (150) being connected to the interface and configured to receive a data set from user input.

In a 12$^{th}$ aspect according to the 11$^{th}$ aspect, the interface comprises one or more of a keyboard, a screen, a pointing device, a touch screen.

In a 13$^{th}$ aspect according to any one of aspects 1 to 12, the apparatus further comprises connection means (153, 155) connected to the control unit (150) and configured to provide a data communication with a control device, the control device being configured to issue commands to the control unit and/or to send a data set to the control unit, the connection means comprising one or more of a wireless network connection, a wired network connection, a Bluetooth connection.

In a 14$^{th}$ aspect according to the 13$^{th}$ aspect, the control device comprises one of a smart phone, a tablet computer, a personal computer.

In a 15$^{th}$ aspect according to any one of aspects 1 to 14, the support (140) is rotatably associated to the main body (100) and wherein the first actuator is configured to selectively provide the support with a substantially rotatory motion with respect to the main body.

In a 16$^{th}$ aspect according to the 15$^{th}$ aspect, the seating (106) is fixedly positioned with respect to the main body (100), the seating optionally being implemented as an integral portion of the main body, in particular the seating being implemented as a recess in the main body.

In a 17$^{th}$ aspect according to any one of aspects 15 or 16, the support (140) is arranged, in an operating condition of the apparatus (1), superiorly with respect to the seating (106), optionally wherein the support is arranged superiorly with respect to the seating such that any one cartridge (300, 300') of the plurality of cartridges can be positioned, by the first actuator, above a receptacle (200) positioned in the seating.

In an 18$^{th}$ aspect according to any one of aspects 1 to 17, the second actuator (120) comprises a pusher (122) configured to engage a corresponding plunger of a cartridge (300, 300') based on a substantially linear motion path.

In a 19$^{th}$ aspect according to any one of aspects 1 to 18, the seating (106) is configured to releasably hold a sealable receptacle (200) configured to receive one or more liquids or a composition of liquids.

In a 20$^{th}$ aspect according to any one of aspects 1 to 19, the apparatus further comprises a third actuator connected to the control unit (150) and configured to act upon contents of a receptacle (200) positioned in the seating, wherein the control unit is further configured to control the third actuator to modify a homogeneity of the contents.

In a 21$^{st}$ aspect, there is provided a process for blending liquids using an apparatus, the apparatus comprising: a seating (106) configured to receive a receptacle (200); a support (140) having a plurality of slots (142, 142') configured to receive a plurality of cartridges (300, 300'), each slot configured to receive one cartridge of the plurality of cartridges; a first actuator configured to move one of the support and the seating relative to the other, thereby enabling positioning of any one slot (142') of the plurality of slots in correspondence of the seating; a second actuator (120) configured to act upon a cartridge positioned in the slot currently positioned in correspondence of the seating; and a control unit (150) connected to the first and second actuators; the process comprising the steps of: receiving at the support a plurality of cartridges, each of the plurality of cartridges containing a liquid; receiving at the seating a receptacle; receiving at the control unit a data set indicative of a sequence of one or more liquids and, for each of the one or more liquids, an associated quantity of liquid; and, for each respective liquid of the sequence of one or more liquids: controlling, by the control unit, the first actuator to move the support or the seating relatively to the other such that the slot containing a respective cartridge of the plurality of cartridges is positioned in correspondence of the seating, the respective cartridge containing the respective liquid of the sequence of one or more liquids; and controlling, by the control unit, the second actuator to act upon the respective cartridge to release a respective quantity of liquid from the respective cartridge into the receptacle, the respective quantity corresponding to the associated quantity of liquid.

In a $22^{nd}$ aspect according to the $21^{st}$ aspect, the process further comprises the step of mixing contents of the receptacle (200), the mixing optionally being performed after each releasing of a respective quantity of liquid from a respective cartridge (300, 300').

In a $23^{rd}$ aspect according to any one of aspects 21 or 22, the process further comprises receiving a plurality of cartridges (300, 300') in a support (140), each of the plurality of cartridges including a liquid, the support including a plurality of slots (142, 142'), each of the plurality of slots configured to receive one of the plurality of cartridges.

In a $24^{th}$ aspect according to any one of aspects 21 to 23, the apparatus (1) further comprises: sensing means connected to the control unit (150) and configured to determine properties of a respective cartridge positioned in correspondence of the sensing means; storage means (152) configured to store status data indicative of the properties of each cartridge of the plurality of cartridges; the process further comprising, after the step of receiving at the support a plurality of cartridges, each of the plurality of cartridges containing a liquid, the steps of, for each respective slot of the plurality of slots: controlling, by the control unit, the first actuator to position the respective slot (142, 142') of the plurality of slots in correspondence of the sensing means; controlling, by the control unit, the sensing means to determine the presence of a respective cartridge (300, 300') of the plurality of cartridges in the respective slot of the plurality of slots; and, if the presence of the respective cartridge has been determined, controlling, by the control unit, the sensing means to determine the properties of the respective cartridge, generating a status entry indicative of the properties of the respective cartridge, and appending the status entry to the status data.

BRIEF DESCRIPTION OF THE DRAWINGS

The present invention will become clearer by reading the following detailed description, given by way of example and not of limitation, to be read with reference to the accompanying drawings, wherein:

FIGS. 3D and 3E show perspective views of an apparatus according to further aspects of the invention illustrating different stages of operation;

DETAILED DESCRIPTION

Figure 1:
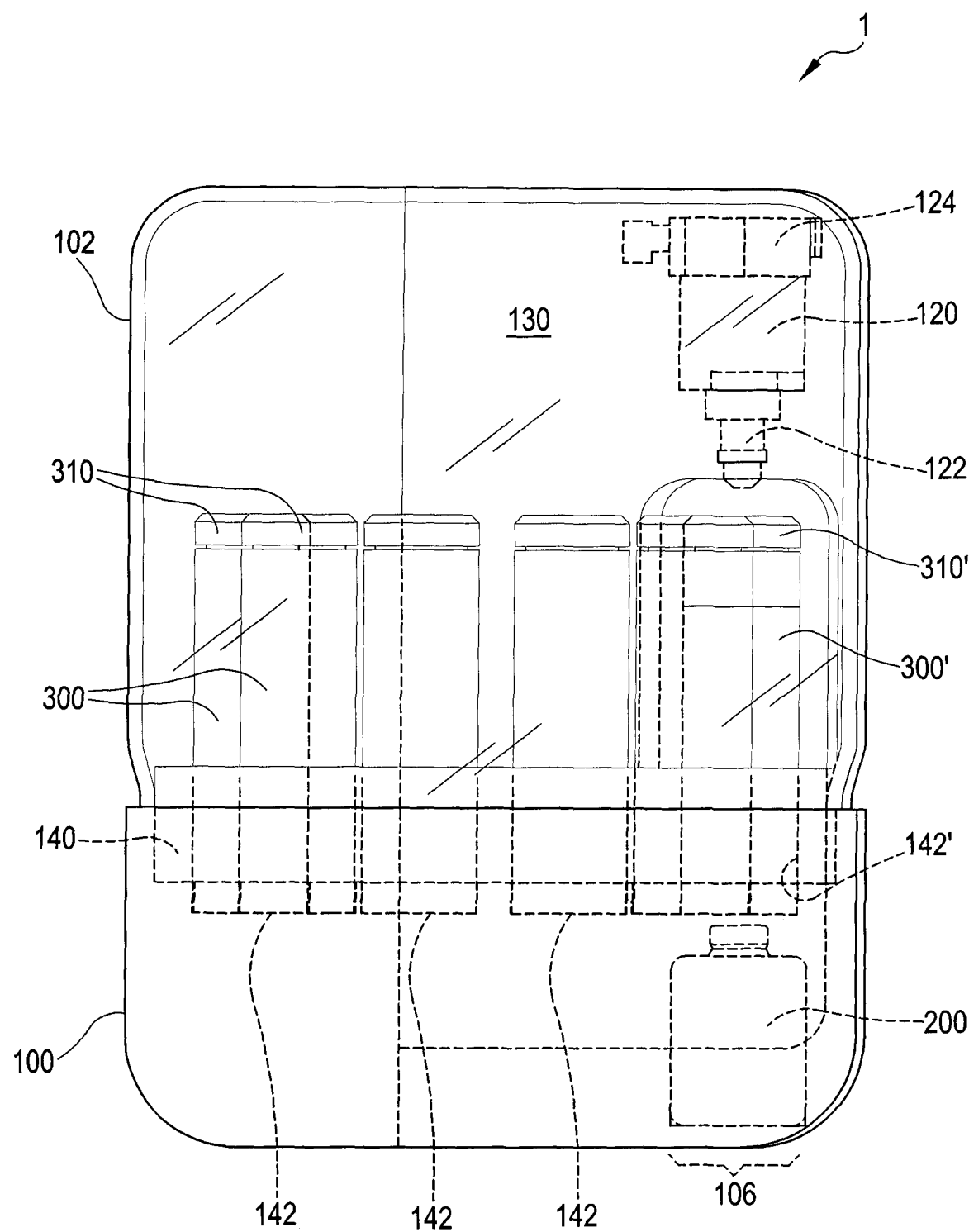
FIG. 1 shows a cross section view of an apparatus according to aspects of the invention.

FIG. 1 shows a cross section view of an apparatus 1 according to aspects of the invention. Apparatus 1 comprises a main body 100 and a cover 102. Main body 100 defines a seating 106 schematically shown in FIG. 1 as a portion of main body 100 configured to receive a receptacle 200. It is understood that seating 106 can be implemented in form of a recess in main body 100 or as a mechanical element, for example including a sliding mechanism (e.g. similar to a drawer), a rotatory mechanism (e.g. similar to hinged element), a pivotable mechanism (e.g. similar to a flap or hatch), or any other mechanism suitable for receiving a receptacle such as receptacle 200. Additionally, seating 106 can include or be combined with a cover mechanism, for example a door, hatch, cover, or other similar element (not visible in FIG. 1).

Main body 100 is further configured to carry a support 140 and a first actuator (not shown) configured to move support 140 relative to seating 106 or vice versa. The first actuator can be implemented as an electric motor carrying or acting upon support 140 and configured to provide support 140 with a rotatory motion relative to seating 106 and main body 100. Alternatively, the first actuator can be configured to provide seating 106 (and, optionally further elements) with relative movement with respect to support 140 (not shown in FIG. 1). It is understood that the first actuator is arranged an configured to provide support 140 and seating 106 with relative motion in order to enable any desired relative positioning of support 140 and seating 106 with respect to one another. In the embodiment shown in FIG. 1, the first actuator is implemented as an integrated actuator acting on a central rotation axis of support 140, thereby providing support 140 with the ability to rotate in either direction within a rotation plane parallel to a surface on which apparatus 1 is situated (e.g. parallel to a table top). Support 140 has a plurality of slots 142, each slot 142 being configured to receive one cartridge 300 of a plurality of cartridges. Further, the first actuator is configured to position any one of slots 142 in correspondence of an operating region of a second actuator, the slot being positioned in the operating region being denoted as slot 142'.

In the embodiment shown in FIG. 1, apparatus 1 includes a second actuator 120 connected to main body 100 and configured to act upon a cartridge 300' positioned in correspondence of an operating region of second actuator 120. In the embodiment shown in FIG. 1, second actuator 120 is implemented as a linear actuator configured to move a pusher 122 in a substantially vertical direction (with respect to an operating configuration in which apparatus 1 is placed on a substantially horizontal surface, vertical meaning a direction substantially perpendicular to the horizontal surface). Second actuator 120 can be attached to main body 100 via a fitting 124 and a carrier 130. However, it is understood that any other suitable structure for arranging second actuator 120 with respect to a cartridge 300' can be employed (e.g. a bridge-type structure, a boom-type structure, or a column-type structure). Pusher 122 is configured to act upon a corresponding plunger of cartridge 300', thereby causing output of liquid from cartridge 300', for example at an opposite end thereof. In some embodiments, the pusher is configured to exert a force of at least 30 N upon the plunger of a cartridge 300' in order to cause release of liquid from the cartridge 300'.

In the embodiment shown in FIG. 1, second actuator 120, slot 142', and seating 106 are arranged such that pusher 122, a cartridge 300' placed in slot 142', and a receptacle 200 placed in seating 106 are substantially arranged along a common longitudinal axis. This can entail that an actuation force exerted by second actuator 120 using pusher 122 acting upon an active end 310' of cartridge 300' can be distributed substantially along the longitudinal axis, substantially uniformly, and without creating significant lateral force or forces acting upon the cartridge.

Apparatus 1 further comprises a control unit (not shown in FIG. 1) connected to several components of apparatus 1, for example to the first actuator, to second actuator 120, and to other components (e.g. sensors, actuators, input/output means). During operation of apparatus 1, the control unit is configured to control components of apparatus 1 in accordance with specific operating processes, for example an operating process for blending liquids, or an operating process for generating status data for apparatus 1. Generally, the control unit is configured to control the first actuator to create relative motion between the support and the seating in order to position any one of the cartridges 300 in the position illustrated by cartridge 300'. Reference numeral 300 merely denotes any one of cartridges 300 not positioned in correspondence of the seating and/or second actuator 120, and reference numeral 300' merely denotes one cartridge 300' of the plurality of cartridges which is positioned in correspondence of the seating and/or second actuator 120. Further, the control unit is configured to control second actuator 120 to act upon a plunger 310' of cartridge 300' in order to transfer a predetermined amount of liquid from cartridge 300' to a receptacle 200. These processes are detailed further below.

Figure 1A:
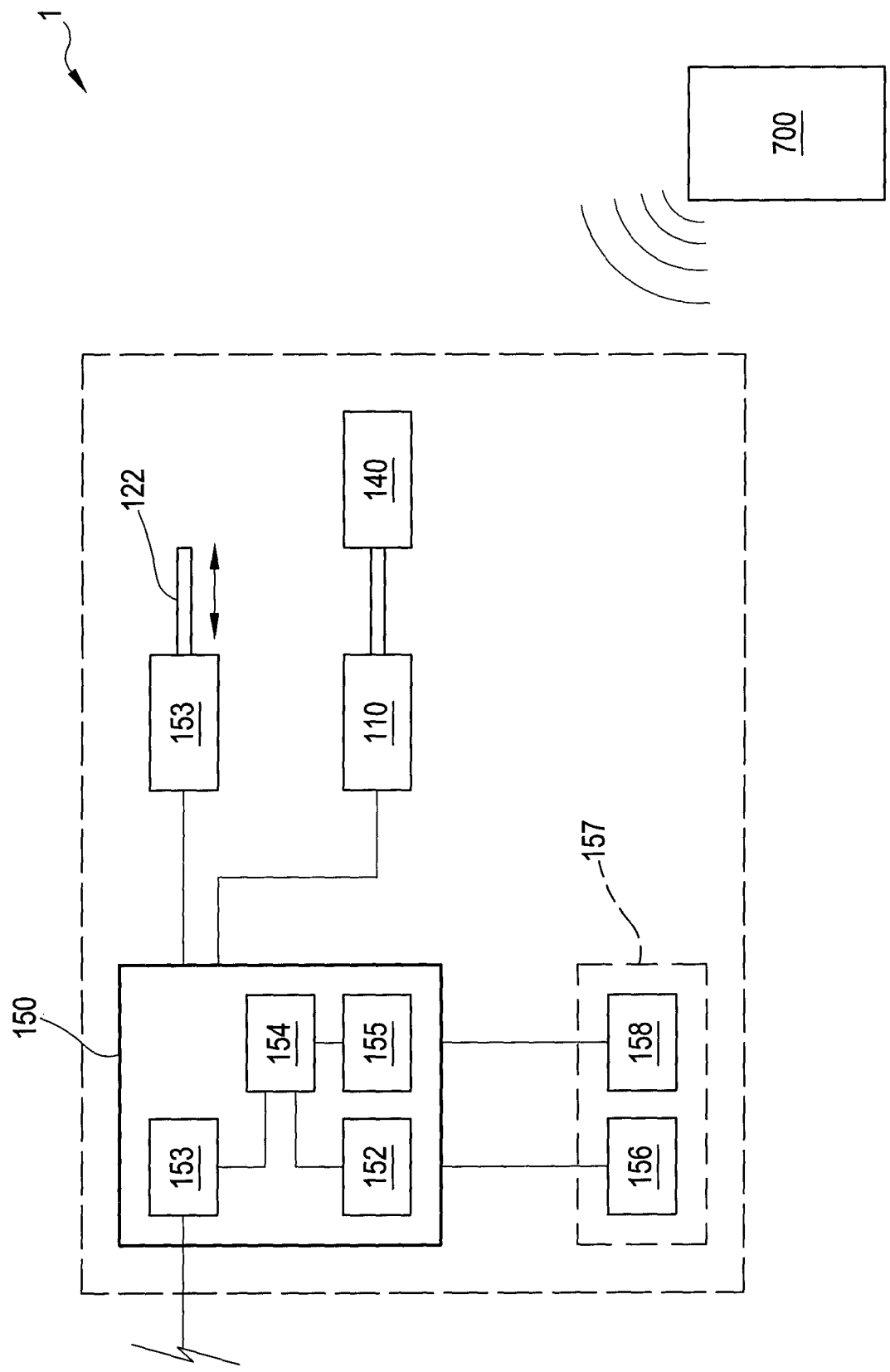
FIG. 1A shows a schematic representation of components of an apparatus according to aspects of the invention.

FIG. 1A shows a schematic representation of components of an apparatus according to aspects of the invention. Apparatus 1 includes a control unit 150, first actuator 110, and second actuator 120. First actuator 110 is connected to support 140, and second actuator 120 is configured to act upon a cartridge 300 (not shown) using pusher 122. Control unit 150 includes a processing unit 154 connected to one or more of a memory unit 152, a (wireless) communication unit 155, and a (wired or wireless) network connection device 153. Network connection device 153 is configured to provide control unit 150 with network communication functionality, such that control unit 150 can send/receive data to and from remote devices (e.g. remote control devices, data storage devices) over a computer network (e.g. LAN, WLAN, Internet). This functionality can be used to access remotely stored data sets containing recipes representative of a particular blend of liquids. This allows for a user to access recipes shared by other users and/or to share their recipes with other users. In some embodiments, a collection of data sets (e.g. recipes) may comprise locally stored data sets and/or remotely stored data sets, optionally wherein the data sets can be accessed in a transparent manner irrespective of their respective place of storage. In some embodiments, network connection device includes a wired and/or wireless data connection (e.g. Ethernet IEEE 802.X). Wireless communication unit 155 can serve to provide local communication to other devices (e.g. over Bluetooth).

Apparatus 1 may further include input/output means 156 (e.g. keyboard) and 158 (e.g. display) or a combination thereof 157 (e.g. touchscreen). Input means 156 can include a physical keyboard or a software keyboard (e.g. realized as a virtual keyboard on a touch screen) in order to provide apparatus 1 with means for a user to provide input to apparatus 1 and/or to generally operate apparatus 1. Input means 156 can alternatively include one or more buttons configured to facilitate basic operation of apparatus 1 (e.g. on/off button, eject button for seating cover 104). Similarly, output means 158 can include a display or a touch screen configured to provide the user with a graphical visualization and/or user interface configured to facilitate more complex interaction. Output means 158 can alternatively include one or more visual elements (e.g. LEDs) in order to facilitate basic operation of apparatus 1.

In a preferred embodiment, apparatus 1 is operated remotely using a remote input/output device 700, for example a smart phone, tablet computer, or similar device. In this preferred embodiment, the remote input/output device establishes data communication over one of the communication unit 155 and the network connection device 153. A corresponding user interface provided at the remote input/output device provides the user with a means to operate substantially all functions of apparatus 1. In some examples, the user can access different recipes, the recipes containing a data set representative of a particular blend of liquids, stored either locally in memory unit 152 or remotely on input/output device 700. In other examples, different recipes can be retrieved for use from other sources available via a data network (e.g. a web server, database, other remote input/output devices).

Figure 2:
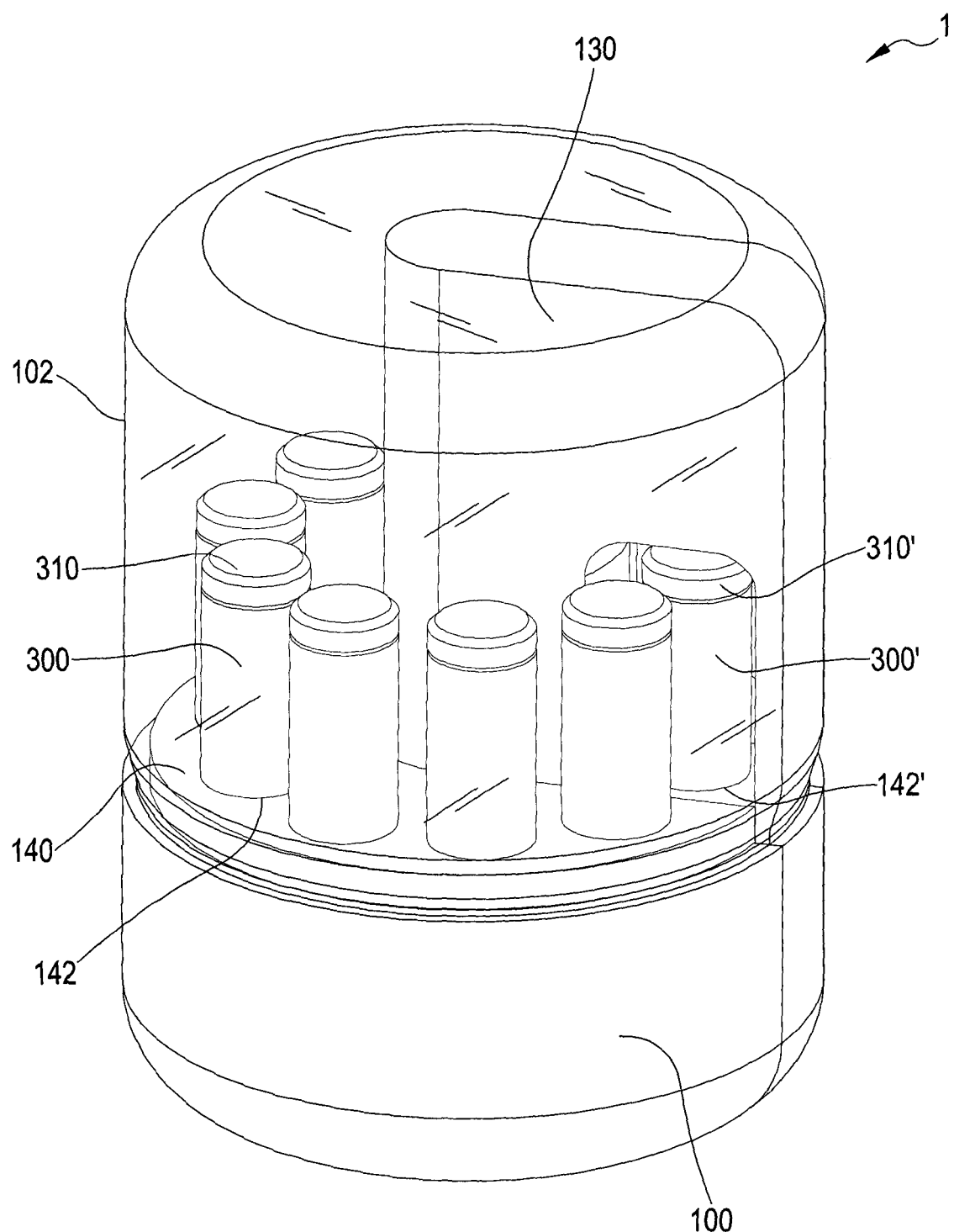
FIG. 2 shows a perspective view of an apparatus according to aspects of the invention.

FIG. 2 shows a perspective view of an apparatus according to aspects of the invention. This perspective view illustrates further how support 140 is configured to receive, in corresponding slots 142, a plurality of cartridges 300. Support 140 is configured to connect to main body 100 in a rotatable manner, such that based on a relative motion between support 140 and the main body, the latter including seating 106 (not shown in FIG. 2), such that any one slot 142 can be positioned in correspondence of carrier 130, second actuator 120 (not shown), and seating 106 (not shown). In the embodiment shown in FIGS. 1 and 2, carrier 130 is implemented as a supporting element substantially bridging from a central portion of main body 100 towards an outer perimeter of main body 100. Carrier 130 defines by way of an opening a general position of cartridge 300' and/or slot 142' in correspondence of carrier 130, second actuator 120 (not shown), and seating 106 (not shown).

Figure 3A:
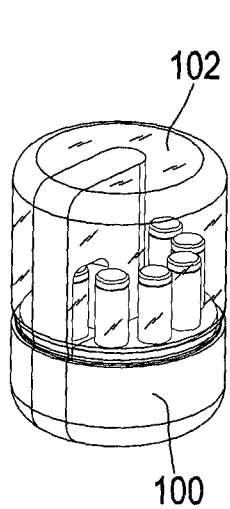
FIGS. 3A, 3B, and 3C show perspective views of an apparatus according to aspects of the invention illustrating different stages of operation.
Figure 3B:
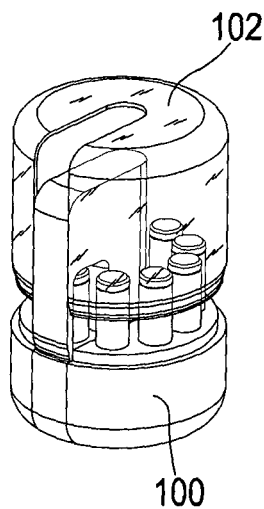
Figure 3C:
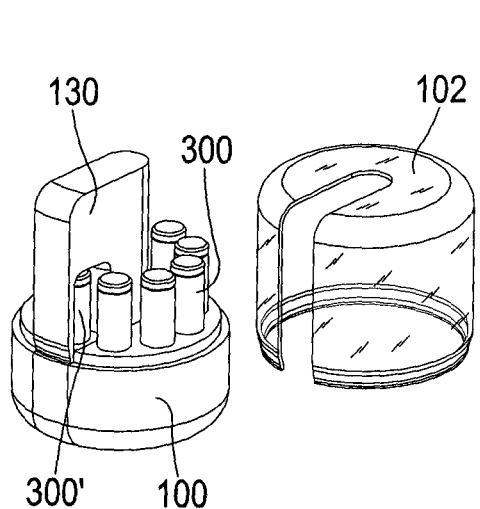

FIGS. 3A, 3B, and 3C show perspective views of an apparatus according to aspects of the invention illustrating different stages of operation. FIG. 3A shows a perspective view of apparatus 1 in a general operating configuration. A cover 102 is in place on main body 100, thereby enclosing internal and/or movable components of apparatus 1. As described, the first actuator can be controlled to move support 140 relative to main body 100. Cover 102, if made from at least partially transparent material (e.g. non-opaque thermoplastic material) facilitates visual feedback with respect to a process being performed using apparatus 1 while preventing mechanical interference from outside, possibly compromising or negatively affecting the respective process. FIGS. 3B and 3C show perspective views illustrating how cover 102 can be removed, for example for service and/or maintenance processes. If any one cartridge 300, 300' needs replacement, or if any other (user-serviceable) component of apparatus 1 needs to be serviced, a user can simply remove cover 102 as shown and remove and/or replace any of cartridges 300, 300'. As far as desired, a user can perform additional tasks on respective components or apparatus 1 (e.g. cleaning or servicing). Upon completion of the task or tasks, cover 102 can be replaced on main body 100 as shown in FIG. 3A. Apparatus 1 can comprise a safety component (e.g. sensor, switch, or similar) and the control unit can be configured to allow regular operation of apparatus 1 only if cover 102 is securely placed (optionally fastened, latched) on main body 100, for example by detecting an incorrectly placed or missing cover 102 based on a signal provided by the safety component.

FIGS. 3D and 3E show perspective views of an apparatus according to further aspects of the invention illustrating different stages of operation. In contrast to the embodiment described with respect to FIGS. 3A to 3C, cover 102' as shown in FIGS. 3D and 3E is designed as a cover integrated into and relatively movable with respect to main body 100. In some examples, a cover actuator is integrated into carrier 130 or main body 100 and is configured to provide cover 102' with the ability to relatively move with respect to the carrier 130 and the main body 100 at least from a first position in which an operating region located generally underneath top portion 131 of carrier 130 and enclosing cartridges 300 and support 140 is accessibly by a user (e.g. in order to place into, remove from, or replace individual cartridges in support 140, and a second position in which the operating region is not accessible to the user. FIG. 3D illustrates the second position in which cover 102' renders the operating region it encloses inaccessible to a user. In this configuration, apparatus 1 can operate in order to blend multiple liquids in cartridges 300 without the danger of manual interference during the blending process due to a user interfering with the movements of support 140 and/or pusher 122 (not shown). In some embodiments, pressing a corresponding button 134, for example located on the front surface 136 of the carrier 130 (see both FIGS. 3D and 3E), activates the cover actuator and lowers or raises the cover 102'.

FIGS. 3D and 3E further illustrate an additional possibility for user interaction. A circular operating element 132 may be integrated into the top portion 131 of the carrier 130. The operating element 132 facilitates manually triggered rotation of the support 140 in order to allow a user to insert a cartridge 300 into a free slot 142. A user can put their finger upon the circular operating element 132 and perform a rotatory gesture in either clockwise or anti-clockwise direction. A corresponding sensor element (not shown) integrated into the circular operating element 132 senses the user interaction and the control unit controls a corresponding rotation of the support 140 into the respective direction (e.g. clockwise or anti-clockwise). In this manner, any of the slots 142 can be moved into a desired position in order to facilitate inserting a cartridge 300 into the respective slot 142. Likewise, any of the occupied slots 142 can be moved into a desired position in order to remove a cartridge 300 from the support 104 or to replace the cartridge 300 with another one. In some embodiments, the operating element 132 is only active as long as the cover 102' is in the upper position, thereby preventing any unintended manual interaction with the support 140 while it is in motion.

Figure 4A:
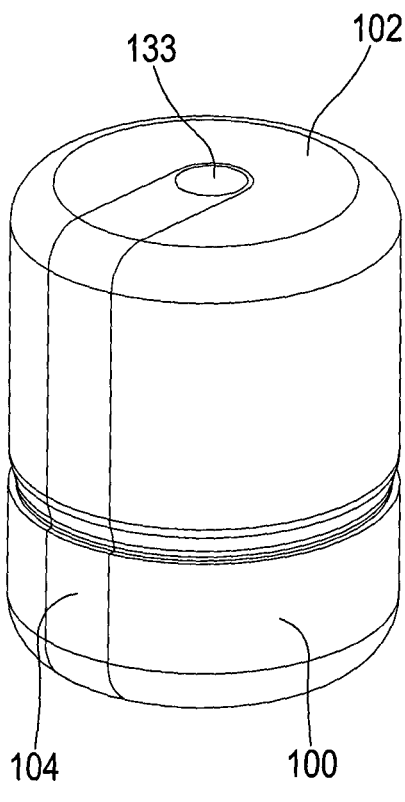
FIGS. 4A and 4B show perspective views of an apparatus according to aspects of the invention illustrating further different stages of operation.
Figure 4B:
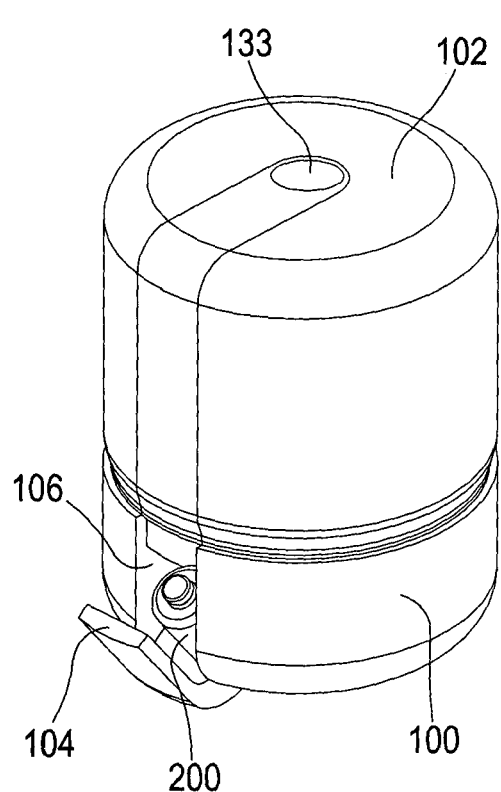

FIGS. 4A and 4B show perspective views of an apparatus according to aspects of the invention illustrating further different stages of operation. FIG. 4A shows a perspective view of apparatus 1 in a general operating configuration. Cover 102 is in place on main body 100, thereby enclosing internal and/or movable components of apparatus 1. Alternatively, cover 102' is in the second position (see above). It is noted that the embodiment shown in FIGS. 4A and 4B can alternatively be provided with an integrated cover 102' as described above with respect to FIGS. 3D and 3E. Further, a seating cover 104 is in place (or in a closed configuration, if cover 104 is non-removable) such that seating 106 is covered and a receptacle 200 placed in correspondence of the seating is fixedly held in position. In this configuration, apparatus 1 can be operated and, for example a process for blending liquids can be performed. Other processes can also be performed (e.g. generating status data; see below). FIG. 4B shows apparatus 1 in, a configuration where seating cover 104 is in an open configuration and where seating 106 is accessible by a user for the purpose of placing or removing a receptacle 200 into or from seating 106. It is understood that the same can be achieved with a removable seating cover (not shown), in which case seating 106 can be accessed through the resulting opening. Moreover, in some embodiments apparatus 1 does not comprise a seating cover 104 but presents an opening in a side wall of main body 100 which is configured to receive a receptacle 200. In these embodiments, a mechanical lock acting upon receptacle 200 can be employed in order to prevent premature removal of receptacle 200.

Seating cover 104 can be implemented as a hatch-type mechanism as shown in FIG. 4B. In this embodiment, seating cover 104 can be tilted outwardly either manually by a user or using an actuator controlled by the control unit. In some implementations, second actuator 120 is configured to not only act upon cartridge 300' as described above (e.g. in one direction of movement), but also configured to actuate or unlock seating cover 104 (e.g. when operated into an opposite direction of movement). In this manner, a single actuator can be configured for multiple functions. In some embodiments seating cover 104 can be configured to be locked/unlocked as controlled by the control unit, regardless of whether seating cover 104 is operated manually or automatically. These embodiments allow for locking of seating cover 104, thereby preventing premature removal of receptacle 200 or other tampering with receptacle 200 during operation of apparatus 1. Apparatus 1 can include a means for detecting (e.g. sensor, switch; not shown) a receptacle 200 placed in seating 106 and the control unit can be configured to perform specific processes (e.g. process 500, see below) only when a suitable receptacle is detected by the means for detecting.

FIGS. 4A and 4B further show an element used to address the issue of olfactory habituation. When being subjected to a number of scents and/or fragrances for an extended period of time can impair a users ability to distinguish between different scents and/or fragrances. Placing a substance configured to reset the users olfactory senses into the area of element 133 helps the user to "reset" his or her senses and to restore the ability to distinguish between different scents and/or fragrances. To this aim, the area of element 133 is configured to receive such substances, for example a couple of coffee beans, in order to provide a possibility to counter olfactory habituation while preparing one or more perfume samples.

Figure 5:
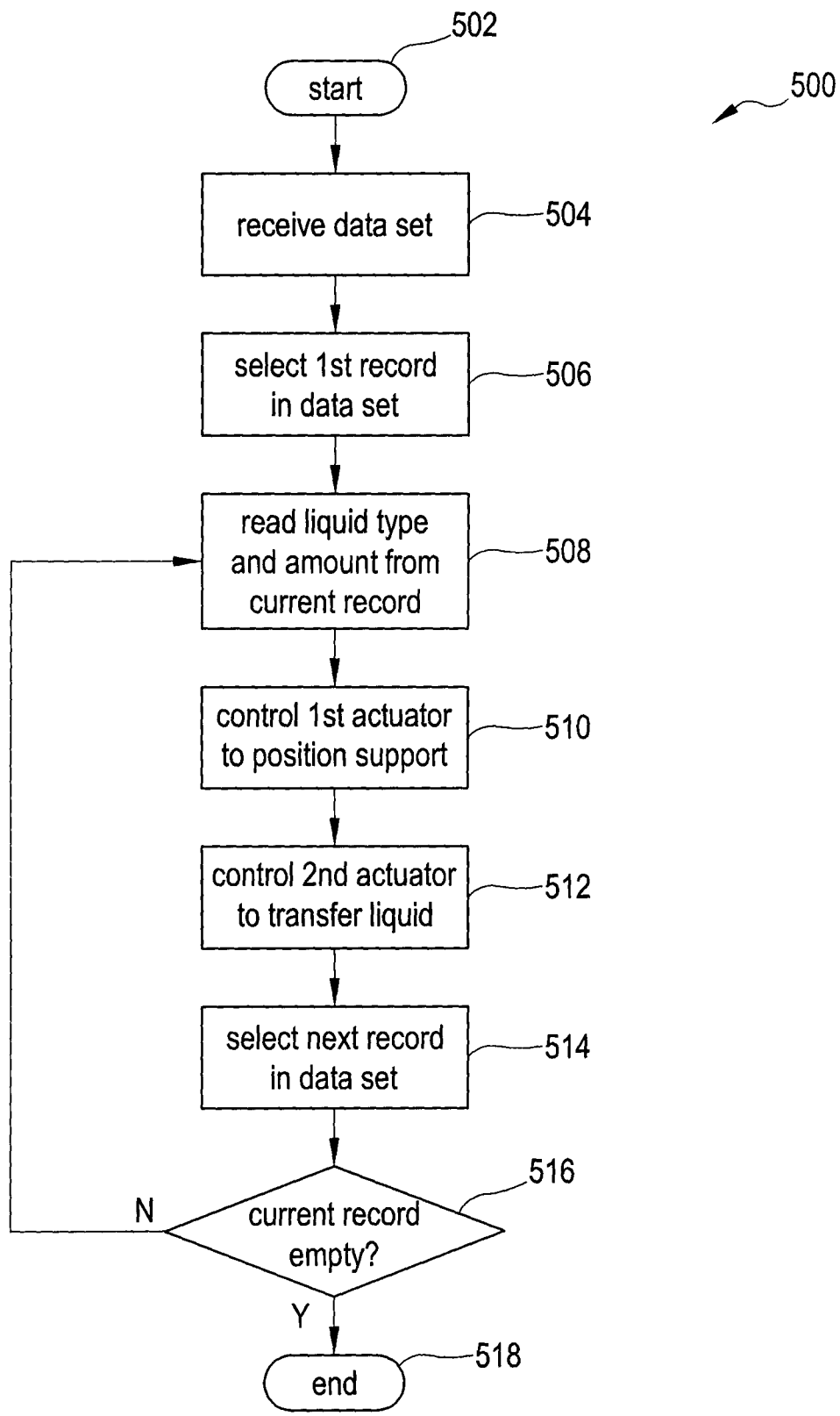
FIG. 5 is a flow chart illustrating a process for blending liquids.

FIG. 5 is a flow chart illustrating a process for blending liquids. Process 500 starts at step 502. In step 504 a data set is received at the control unit. The data set is indicative of a plurality of liquids and amounts of liquids, the relative amounts of liquid and the types of liquid used corresponding to a recipe for a composition or blend of liquids. In one example, the data set can comprise a plurality of records, each record being indicative of a type of liquid and an amount of liquid. Table a) below shows an example data set represented in tabular form:

TABLE a

| Record # | Type | Amount |
|---|---|---|
| 1 | Liquid A | 3 ml |
| 2 | Liquid B | 7 ml |
| 3 | Liquid C | 5 ml |
| 4 | Liquid D | 1 ml |

The control unit is configured to receive the data set, for example from a user interface, from an external data source (e.g. network connection, data carrier), or from a storage memory integrated into the control unit. In step 506, the control unit selects the first record. In step 508 an identifier for the liquid type (e.g. "Liquid A", "LT1668") and a value indicative of an amount (e.g. a value in ml or a value indicative of a ratio; in the latter case, one convention can be that all ratios within a recipe add up to 100%). Optionally, the control unit then performs a check whether status data indicative of a range of liquids available (see below) include cartridges containing each of the liquids included in the recipe. If any one of the constituent components is not available (e.g. a corresponding cartridge is not present or an amount available is less than an amount required), then control unit can provide a corresponding signal to the user (e.g. an audio signal or a visual signal). In step 510, the control unit controls the first actuator to relatively position the support and the seating such that a cartridge 300 containing the corresponding type and amount of liquid in the first record is positioned in correspondence of the seating. In detail, the control unit can determine, based on status data indicative of a status of apparatus 1, which slot 142 of the plurality of slots holds the cartridge 300, which contains the required amount of liquid of the type indicated in the first record. Then, the control unit can determine a rotation direction and distance which, when performed by the first actuator, would position the cartridge (or the respective slot) in the position of cartridge 300' (or slot 142') as shown in FIGS. 1 and 2. At the end of this step, the corresponding cartridge 300' is positioned in correspondence of receptacle 200 placed in seating 106. In step 512, the control unit then controls second actuator 120 in order to transfer the required amount of liquid from cartridge 300' into receptacle 200. This can be achieved, for example, by second actuator 120 extending pusher 122 towards and into contact with plunger 310' of cartridge 300'. Upon contact, further extending pusher 122 in order to move plunger 310' ejects, at an opposite end of cartridge 300', an amount of liquid corresponding to the distance of further pushing by pusher 122. In other words, a specific distance of pusher 122 moving plunger 310' (e.g. 2 mm) leads to a specific amount of liquid being ejected from cartridge 300' (e.g. 5 ml). It is noted that the exact correlation of plunger movement and ejected liquid depends on different cartridge and/or plunger properties. Cartridges can be provided, for example depending on their contents, with different internal diameters and corresponding plungers. Thus, an identical movement of a small plunger in a narrower canal, can lead to a lower volume of liquid being ejected. Cartridges 300 can further include, at an end opposite to the plunger 310, an element effectively acting like a valve in order to prevent unwanted ejection of liquid or in order to provide a suitable counter pressure for more exact dosing. In step 514, the control unit selects the next record in the data set and checks, whether the record is empty (e.g. determining the presence of an empty set or a set corresponding to an end-of-file status) and, if it is not empty, continue with the new current record at step 508. If the record is empty or the end of the data set is reached, process 500 ends at step 518. In some embodiments, an additional step (or steps) of mixing the contents of receptacle 200 can be performed (e.g. after step 512 or before ending the process at step 518). It is understood that a step of (intermediate or final) mixing can necessitate additional components, for example a third actuator for mixing, possibly including a corresponding mixing tool. At the end of process 500, receptacle 200 contains a composition corresponding to the data set on which the composition was prepared. Based on the example shown in Table a), receptacle 200 contains substantially (not taking, e.g., evaporation into account) an amount of 20 ml of a composition containing liquids A, B, C, and D in the respective individual amounts listed in Table a).

Figure 6:
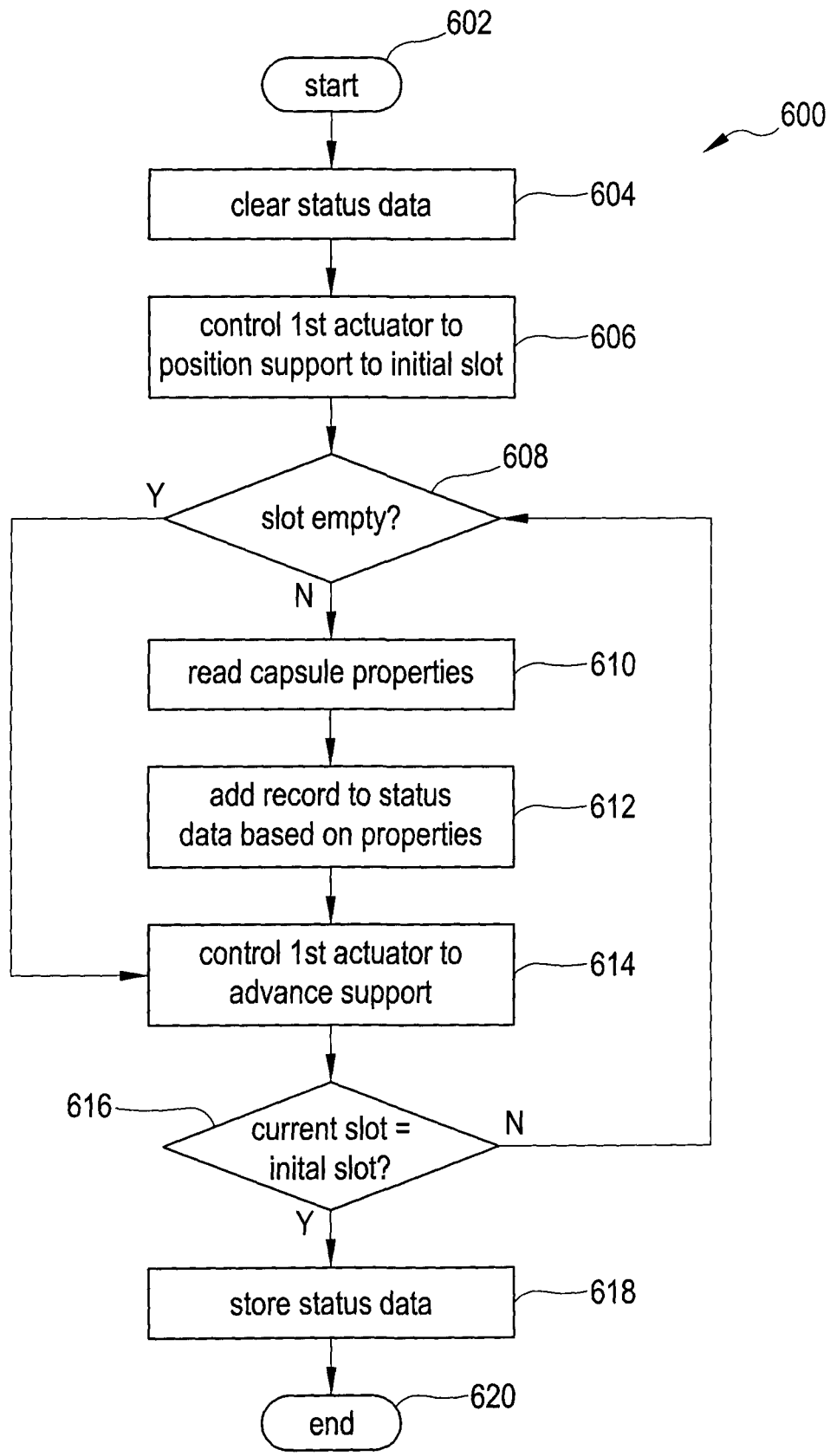
FIG. 6 is a flow chart illustrating a process for generating status data.

FIG. 6 is a flow chart illustrating a process for generating status data. Process 600 starts at step 602. In step 604, previously present status data are cleared from storage memory of the control unit. It is noted that this step is optional and can be skipped if, for example, no previous storage data were present (e.g. at initialization of apparatus 1) or if status data present in storage memory can be overwritten. In step 606, the control unit controls the first actuator to position support 140 having one of slots 142 in an initial position. This can be achieved by actually re-positioning support 140 (if it is not already in the required position) or by marking, in storage memory, the current position of any one of the slots 142 as denoting the initial position in relation to, for example, seating 106. Generally, the control unit stores an initial position and detects whether support 140 is currently positioned as defined in the initial position. In step 608, the control unit determines whether there is a cartridge present in a respective slot of support 140. In some embodiments, the presence and properties of a cartridge are determined when the cartridge is in slot 142', that is, when the cartridge is positioned in correspondence of second actuator 120 and seating 106. It is noted that any other definition can be used (e.g. any one of slots 142). It is understood that specific components can be used to determine the presence of and/or properties from a cartridge. In the present embodiment, additional sensors can be integrated into carrier 130 and configured to detect the presence of cartridge 300' and the properties thereof. In some embodiments, the sensor or sensors can comprise a sensor (e.g. detecting the presence of cartridge 300' and/or detecting an id element 307 provided on cartridge 300' (e.g. the sensor being an optical sensor and the id element 307 being a bar code or a QR code). The sensors can further comprise additional optical or other sensors configured to determine an amount of liquid 305 contained in cartridge 300'. Determining an amount of liquid contained in a cartridge, however, is optional and can be disregarded depending on the respective embodiment of apparatus 1 and/or cartridge 300, 300'. It is noted that determining the amount of liquid—if performed—can be achieved in an active manner (e.g. measurement or sensing by apparatus 1) or in a passive manner (e.g. data being provided by cartridge 300' having an integrated measuring system (e.g. built-in sensor and RFID circuitry). In step 610, the control unit determines properties of cartridge 300' using sensors as described above with respect to determining the presence of cartridge 300'. It is noted that steps 608 and 610 can be performed as a single step, for example when reading properties from cartridge 300' automatically deducing presence of cartridge 300' (and, when reading the properties fails, deducing that no cartridge is present). If cartridge 300' is present, the control unit can determine the type of liquid contained in cartridge 300' and a current amount contained in cartridge 300'. In step 612, upon successfully determining the presence of cartridge 300', the type of liquid contained therein, and (optionally) the amount of liquid contained therein, a record representative of the properties of cartridge 300' is added to the status data. In step 614, the control unit control the first actuator to advance support 140 by one slot, thereby presenting a new slot 142' in correspondence of seating 106 and second actuator 120. In step 616, the control unit determines whether the position of support 140 corresponds to the initial position, that is whether the current slot has already been examined. If the initial position has not been reached, then the process continues at step 608 for the new current slot 142' and—if present—the new current cartridge 300'. It is noted that this embodiment assumes a carousel-type support that can rotate and thereby go through all slots and arriving at the initial slot. If a linear support is used (e.g. a rack, slide), then the control unit first controls the actuator to move to the first slot and then advance, one by one, to the last slot, terminating the process (i.e. "Y" at step 616) when the last slot has been examined. If the initial position has been reached (or if the last slot has been examined), the control unit stores the newly generated status data in the storage memory. Table b) below shows example status data represented in tabular form:

TABLE b

| Cartridge | Type | Amount |
|---|---|---|
| 1 | Liquid A | 12 ml |
| 2 | Liquid B | 8 ml |
| 3 | Liquid C | 10 ml |
| 4 | Liquid E | 14 ml |

It is noted that the recipe shown as a data set in table a) could not be provided using an apparatus set up corresponding to the status data shown in table b) because a cartridge containing a liquid of type D is not available, therefore preventing the blending of a composition in accordance with the recipe of table a).

Figure 7:
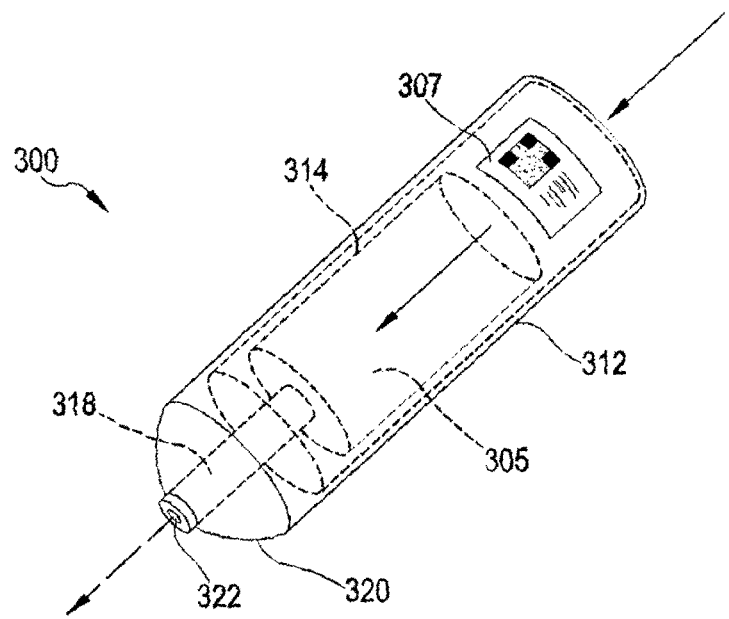
FIG. 7 shows a perspective view of an example cartridge for use with an apparatus according to aspects of the invention.
Figure 7A:
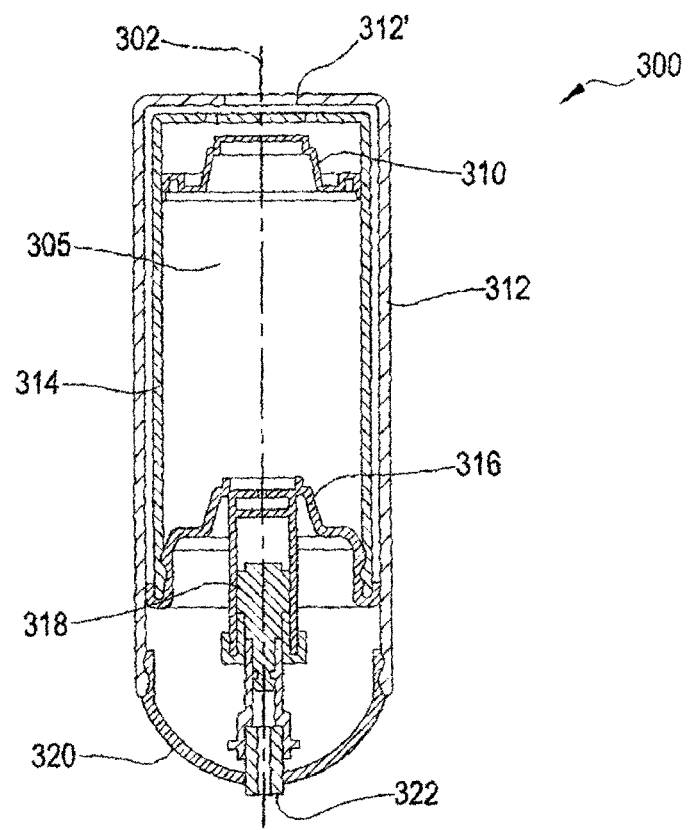
FIG. 7A shows a cross section of an example cartridge for use with an apparatus according to aspects of the invention.

FIG. 7 shows perspective view of an example cartridge for use with an apparatus according to aspects of the invention. FIG. 7A shows a cross section of an example cartridge for use with an apparatus according to aspects of the invention. With respect to both FIGS. 7 and 7A, cartridge 300 includes an outer housing 312 configured to house the cartridge components, an inner housing 314 configured to hold the liquid 305, a plunger 310 configured to adjustably define an inner volume of the inner housing 314, a support 316 configured to fixedly attach to the inner housing 314 and to provide an abutment for the plunger 310, thereby defining a terminal position of the plunger 310 upon emptying of the cartridge 300. The support 316 further carries a pump mechanism 318 configured to selectively dispense a pre-determined amount of liquid upon mechanical interaction by the plunger 310. An outer cap 320 acts as a cover and provides an outlet 322, the outlet being associated either to the pump mechanism 318 or to the outer cap 320. Cartridge 300 further includes an id element 307 configured to store information on the cartridge 300 and/or the liquid contained therein. Id element 307 can include an optical pattern (e.g. a bar code or a QR code) readable by a suitable optical scanner. Alternatively or additionally, id element 307 can include an RFID tag configured to store the information readable by a corresponding RFID scanner. An RFID scanner (e.g. an RFID reader/writer) can also be used to update information stored on the RFID tag. For example, the information stored can be updated during each use, thereby providing a mechanism in which the cartridge stores information about a residual amount of liquid contained therein, based on the number of dispensing actions the cartridge has received. Id element 307 can be provided as an outer label affixed to the cartridge 300, for example further showing human readable information (e.g. a color code, written information). This is required when id element 307 contains an optical pattern to be read by an optical scanner. In other embodiments, id element 307 can be provided inside cartridge 300, thereby not impacting an outer appearance of the cartridge 300. This can be achieved, for example, when using RFID tags or other wirelessly readable components.

FIG. 7A illustrates the interaction of the mechanical components inside the cartridge 300 during dispensing of liquid. It is noted that the plunger 310, the inner and outer housings 314 and 312, the support 316 and the pump mechanism 318 are substantially aligned along a longitudinal axis 302 of the cartridge 300 in order to provide a syringe-like layout for the components. The pusher 122 is configured to act upon the inner housing 314 by moving through an opening 312' provided in the outer housing 312 and located at the upper end of cartridge 300. Optionally, a seal covering the opening 312 can be provided (e.g. a label, sticker, or similar removable or breakable element). Providing a seal can be done in order to give an indication to the user that the cartridge has not been in use before. Upon interaction of the pusher 122, housing 314 is pushed, together with support 316, substantially along the direction of axis 302 towards outer cap 320. A slidable component of the pump mechanism 318 abuts the outer cap 320 such that the movement of the inner housing 314 causes different components of the pump mechanism 318 to shift their positions relative to one another as the pump mechanism 318 is compressed between the outer cap 320 and the inner housing 314. The pump mechanism 318 holds a pre-determined amount of liquid, for example 0.2 ml, and includes a spring-loaded mechanism that reacts to the compressive force by releasing the pre-determined amount of liquid held in the pump mechanism 318 through outlet 322. The pump mechanism 318 is configured to release only the pre-determined amount of liquid during a single action of the pusher 122. Releasing additional liquid requires the pusher 122 to release the pressure on the plunger 310 (e.g. retract to its original position), thereby allowing the spring-loaded mechanism of the pump mechanism 318 to return to its relaxed configuration. This allows a subsequent pre-determined amount of liquid to enter the pump mechanism in order to be released upon the next action of the pusher 122. Plunger 310 is configured to gradually move towards support 316 as liquid is released from inner housing 314. This can be achieved by plunger 310 gradually moving towards support 316 due to a pressure decrease in liquid 305 when the pump mechanism 318 takes in a pre-determined amount of liquid from the inner housing 314.

In this manner, liquid 305 can be released from the cartridge with a resolution of the pre-determined amount. A pre-determined amount of liquid 305 of 0.2 ml, for example, allows for the release of any amount of liquid that can be divided by 0.2 ml (e.g. 0.2 ml, 0.4 ml, 0.6 ml, etc.). Different cartridges 300 can include pump mechanisms that release different pre-determined amounts of liquid, for example when the respective cartridge holds a liquid that typically requires larger amounts to be released. In such cases, the information stored in the id element 307 can also contain data representative of the pre-determined amount of liquid that is released per actuation cycle of the cartridge pump mechanism 318. The concept of releasing a pre-determined amount of liquid at each actuation of the pusher 122 facilitates releasing liquid with a very high precision and in a reliable manner while at the same time reducing the complexity of the dispensing mechanism.

The liquid 305 in cartridges 300 has no contact to the ambient atmosphere due to the inner volume of inner housing 314 being gradually reduced upon emptying of the cartridge 300. The pump mechanism 318 and the plunger 310 are configured not to allow the ingress of any air or other substance into the inner housing 314. In this manner, the liquid 305 is preserved even when the cartridge is not in use for an extended period of time. Cartridges 300 can be re-used when they have been emptied. This can be achieved by disassembling and cleaning cartridge components and by refilling inner housing 314 with fresh liquid 305. In some embodiments, cartridges can be designed as disposable articles.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. An apparatus for blending perfumes, comprising:
a main body comprising a seating configured to receive a receptacle;
a support carried by the main body and having a plurality of slots;
a plurality of cartridges received by the support, a cartridge of the plurality of cartridges being received by a respective slot of the plurality of slots;
a first actuator configured to move one of the support and the seating relative to the other, thereby enabling positioning of any one slot of the plurality of slots in correspondence of the seating,
a second actuator configured to act upon the cartridge of the plurality of cartridges placed in the slot currently positioned in correspondence of the seating; said second actuator comprising a pusher configured to engage a corresponding plunger of the cartridge of the plurality of cartridges based on a linear motion path; and
a control unit connected to the first and second actuators;
a storage configured to store a plurality of data sets, wherein the storage is configured to store status data indicative of the properties of each cartridge of the plurality of cartridges,
a sensor connected to the control unit and configured to determine properties of the cartridge of the plurality of cartridges positioned in correspondence of the sensor;
wherein the first actuator is further configured to move the support and the sensor relative to each other, thereby enabling positioning of any one slot of the plurality of slots in correspondence of the sensor,
the control unit is configured to:
receive a data set indicative of a sequence of one or more liquids and, for each of the one or more liquids, an associated quantity of liquid; the data set corresponding to one of the plurality of data sets; and
for each respective liquid of the sequence of one or more liquids:
control the first actuator to move the support or the seating relatively to each other such that the slot holding the cartridge is positioned in correspondence of the seating, said cartridge containing the respective liquid of the sequence of one or more liquids; and
control the second actuator to act upon the cartridge to cause transfer of a respective quantity of liquid from the cartridge into a receptacle positioned in the seating, the respective quantity corresponding to the associated quantity of liquid;
generate status data based on the plurality of cartridges for each respective slot of the plurality of slots of the support, wherein said generate status data comprises:
controlling the first actuator to position the respective slot of the plurality of slots in correspondence of the sensor;
controlling the sensor to determine the presence of the cartridge of the plurality of cartridges in the respective slot of the plurality of slots; and
if the cartridge is determined to be present, controlling the sensor to determine the properties of the said cartridge, generating a status entry indicative of the properties of the cartridge, and appending the status entry to the status data, wherein determining of the presence of the cartridge or determining of the properties of the cartridge is based on an identification element comprised in the cartridge, the identification element comprising one of:
a machine-readable optical pattern,
a radio frequency identification tag, or
an integrated circuit configured for data communication with the control unit and store the status data in the storage.

2. The apparatus of claim 1, wherein, upon receiving the data set, the control unit is further configured to determine, based on the data set and the status data, whether any of the following conditions is fulfilled:
the sequence of one or more liquids includes at least one liquid for which no corresponding cartridge of the plurality of cartridges is contained in the status data;
the sequence of one or more liquids includes at least one associated quantity of liquid to be released for which a corresponding cartridge of the plurality of cartridges contained in the status data is associated with an insufficient amount of liquid contained in the corresponding cartridge.

3. The apparatus of claim 1, wherein the cartridge includes an outer housing configured to house the cartridge components, an inner housing configured to hold a liquid, a plunger configured to adjustably define an inner volume of the inner housing, a support configured to fixedly attach to the inner housing and to provide an abutment for the plunger, thereby defining a terminal position of the plunger upon emptying of the cartridge, the support further carrying a pump configured to selectively dispense a pre-determined amount of liquid upon mechanical interaction by the plunger, wherein an outer cap acts as a cover and provides an outlet, the outlet being associated either to the pump or to the outer cap.

4. The apparatus of claim 1, wherein the identification element is indicative of the properties, the identification element comprising one of:
a bar code, a matrix code, or a QR code,
wherein
the properties include one or more of:
a type of liquid of the cartridge;
a concentration value indicative of a concentration of a substance present in the liquid of the cartridge;
a number of release cycles the cartridge has been subjected to;
an expiration date indicative of a storage life of the liquid contained in the cartridge; and
an amount of liquid contained in the cartridge.

5. The apparatus of claim 3, wherein, upon interaction of the pusher, the inner housing is pushed, together with the support, along the direction of a longitudinal axis towards the outer cap, a slidable component of the pump abuts the outer cap such that the movement of the inner housing causes different components of the pump to shift their positions relative to one another as the pump is compressed between the outer cap and the inner housing.

6. The apparatus of claim 5, wherein the plunger, the inner and outer housings, the support and the pump are aligned along a longitudinal axis of the cartridge.

7. The apparatus of claim 1, wherein, when the cartridge of the plurality of cartridges is positioned in correspondence of the seating, an outlet of the cartridge is positioned with respect to a receptacle placed in the seating, so that the second actuator can be controlled to cause transfer of liquid from the cartridge through the outlet and into the receptacle placed in the seating and/or further comprising an interface configured to receive input from a user, the control unit being connected to the interface and configured to receive a data set from user input, wherein the interface comprises one or more of a keyboard, a screen, a pointing device, a touch screen.

8. The apparatus of claim 1, further comprising a connection module connected to the control unit and configured to provide a data communication with a control device, the control device being configured to issue commands to the control unit and/or to send a data set to the control unit, the connection module comprising one or more of a wireless network connection, a wired network connection, a Bluetooth connection, wherein the control device comprises one of a smart phone, a tablet computer, a personal computer.

9. The apparatus of claim 1, wherein the support is rotatably associated to the main body and wherein the first actuator is configured to selectively provide the support with a rotatory motion with respect to the main body, wherein the seating is fixedly positioned with respect to the main body, wherein the seating is implemented as an integral portion of the main body, the seating being implemented as a recess in the main body.

10. The apparatus of claim 9, wherein, in an operating condition of the apparatus, the support is arranged above with respect to the seating, such that any one cartridge of the plurality of cartridges can be positioned, by the first actuator, above a receptacle positioned in the seating.

11. The apparatus of claim 1, wherein the cartridge includes a pump holding a predetermined amount of liquid and including a spring, the pump reacts to a compressive force by releasing the pre-determined amount of liquid held in the pump through an outlet, the pump being configured to release only the pre-determined amount of liquid during a single action of the pusher,
wherein releasing additional liquid requires the pusher to release the pressure on the plunger, thereby allowing the spring to return to its relaxed configuration and a subsequent pre-determined amount of liquid to enter the pump in order to be released upon the next action of the pusher.

12. The apparatus of claim 1, wherein the seating is configured to releasably hold the sealable receptacle configured to receive one or more liquids or a composition of liquids and/or further comprising a third actuator connected to the control unit and configured to act upon contents of a receptacle positioned in the seating, wherein the control unit is further configured to control the third actuator to modify a homogeneity of the contents.

13. An apparatus for blending perfumes, comprising:
a main body comprising a seating configured to receive a receptacle;
a support carried by the main body and having a plurality of slots;
a plurality of cartridges received by the support, a cartridge of the plurality of cartridges being received by a respective slot of the plurality of slots;
a first actuator configured to move one of the support and the seating relative to the other, thereby enabling positioning of any one slot of the plurality of slots in correspondence of the seating,
a second actuator configured to act upon the cartridge placed in the slot currently positioned in correspondence of the seating; said second actuator comprising a pusher configured to engage a corresponding plunger of the cartridge based on a linear motion path; and
a control unit connected to the first and second actuators and configured to:
receive a data set indicative of a sequence of one or more liquids and, for each of the one or more liquids, an associated quantity of liquid; and
for each respective liquid of the sequence of one or more liquids:
control the first actuator to move the support or the seating relatively to each other such that the slot holding the cartridge of the plurality of cartridges is positioned in correspondence of the seating, said cartridge containing the respective liquid of the sequence of one or more liquids; and
control the second actuator to act upon the cartridge to cause transfer of a respective quantity of liquid from the cartridge into a receptacle positioned in the seating, the respective quantity corresponding to the associated quantity of liquid,
wherein the apparatus further comprises:
a storage configured to store a plurality of data sets and wherein the control unit is configured to receive the data set from the storage, the data set corresponding to one of the plurality of data sets;
a sensor connected to the control unit and configured to determine properties of the cartridge positioned in correspondence of the sensor;
wherein the first actuator is further configured to move one of the support and the sensor relative to the other, thereby enabling positioning of any one slot of the plurality of slots in correspondence of the sensor, wherein the storage is configured to store status data indicative of the properties of each cartridge of the plurality of cartridges, wherein the control unit is further configured to:

generate status data based on the plurality of cartridges; and store the status data in the storage, wherein the generating comprises, for each respective slot of the plurality of slots of the support:

controlling the first actuator to position the respective slot of the plurality of slots in correspondence of the sensor;

controlling the sensor to determine the presence of the cartridge of the plurality of cartridges in the respective slot of the plurality of slots; and if the presence of the cartridge has been determined, controlling the sensor to determine the properties of the cartridge, generating a status entry indicative of the properties of the cartridge, and appending the status entry to the status data, wherein determining of the presence of the cartridge and/or determining of the properties of the cartridge is based on an identification element comprised in the cartridge.

14. The apparatus of claim 13, wherein the cartridge includes a pump holding a predetermined amount of liquid and including a spring, the pump reacts to a compressive force by releasing the pre-determined amount of liquid held in the pump through an outlet, the pump being configured to release only the pre-determined amount of liquid during a single action of the pusher, wherein releasing additional liquid requires the pusher to release the pressure on the plunger, thereby allowing the spring to return to its relaxed configuration and a subsequent pre-determined amount of liquid to enter the pump in order to be released upon the next action of the pusher.

15. The apparatus of claim 14, wherein the cartridge includes an outer housing configured to house the cartridge components, an inner housing configured to hold a liquid, a plunger configured to adjustably define an inner volume of the inner housing, a support configured to fixedly attach to the inner housing and to provide an abutment for the plunger, thereby defining a terminal position of the plunger upon emptying of the cartridge, the support further carrying the pump configured to selectively dispense a pre-determined amount of liquid upon mechanical interaction by the plunger, wherein an outer cap acts as a cover and provides an outlet, the outlet being associated either to the pump mechanism or to the outer cap.

16. The apparatus of claim 15, wherein, upon interaction of the pusher, inner housing is pushed, together with support, along the direction of a longitudinal axis towards the outer cap, a slidable component of the pump abuts the outer cap such that the movement of the inner housing causes different components of the pump to shift their positions relative to one another as the pump is compressed between the outer cap and the inner housing.

17. The apparatus of claim 16, wherein the plunger, the inner and outer housings, the support and the pump are aligned along a longitudinal axis of the cartridge.

* * * * *